United States Patent
Matsueda et al.

(10) Patent No.: US 7,498,288 B2
(45) Date of Patent: Mar. 3, 2009

(54) EXHAUST GAS-PURIFYING CATALYST AND METHOD OF MANUFACTURING THE SAME

(75) Inventors: Satoshi Matsueda, Shizuoka (JP); Mareo Kimura, Shizuoka (JP); Naoto Miyoshi, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 470 days.

(21) Appl. No.: 11/057,902

(22) Filed: Feb. 14, 2005

(65) Prior Publication Data
US 2005/0215428 A1 Sep. 29, 2005

(30) Foreign Application Priority Data
Feb. 16, 2004 (JP) ............................. 2004-038091
Dec. 9, 2004 (JP) ............................. 2004-356982

(51) Int. Cl.
*B01J 21/06* (2006.01)
*B01J 23/00* (2006.01)
*B01J 23/02* (2006.01)
*B01J 23/10* (2006.01)
*B01J 23/40* (2006.01)
*B01J 23/42* (2006.01)
*B01J 23/44* (2006.01)
*B01J 23/46* (2006.01)
*B01J 23/56* (2006.01)
*B01J 23/58* (2006.01)
*B01J 23/63* (2006.01)
*B01J 37/08* (2006.01)

(52) U.S. Cl. ...................... 502/325; 502/328; 502/332; 502/333; 502/334; 502/335; 502/339; 502/349

(58) Field of Classification Search ................. 502/304, 502/325, 328, 332, 335, 339, 349
See application file for complete search history.

(56) References Cited

U.S. PATENT DOCUMENTS

| | | | | |
|---|---|---|---|---|
| 4,927,799 A * | 5/1990 | Matsumoto et al. | ......... | 502/303 |
| 5,075,276 A * | 12/1991 | Ozawa et al. | ............... | 502/304 |
| 5,147,842 A * | 9/1992 | Funabiki et al. | ............. | 502/304 |
| 5,254,519 A * | 10/1993 | Wan et al. | ................... | 502/252 |
| 5,597,771 A * | 1/1997 | Hu et al. | ..................... | 502/304 |
| 5,945,369 A * | 8/1999 | Kimura et al. | ............. | 502/304 |
| 5,948,376 A * | 9/1999 | Miyoshi et al. | ......... | 423/213.5 |
| 5,948,377 A * | 9/1999 | Sung | ....................... | 423/213.5 |
| 5,958,827 A * | 9/1999 | Suda et al. | .................. | 502/304 |

(Continued)

FOREIGN PATENT DOCUMENTS

EP 0988890 3/2000

(Continued)

*Primary Examiner*—Timothy C Vanoy
*Assistant Examiner*—Serena L Hanor
(74) *Attorney, Agent, or Firm*—Morrison & Foerster LLP

(57) ABSTRACT

An exhaust gas-purifying catalyst includes a support and a catalyst active component including at least one noble metal supported by at least a portion of the support. The support includes a stabilized zirconia containing at least one stabilizing element selected from rare earth elements and alkaline earth elements. 20 to 80% by weight of a total amount of the active component is supported in the support in a form of solid solution with the stabilized zirconia, and 80 to 20% by weight of a total amount of the active component is supported on a surface of at least a portion of the support.

12 Claims, 1 Drawing Sheet

U.S. PATENT DOCUMENTS

| | | | |
|---|---|---|---|
| 6,764,665 B2 * | 7/2004 | Deeba et al. | 423/239.1 |
| 7,297,654 B2 * | 11/2007 | Kimura et al. | 502/326 |
| 2007/0297971 A1 * | 12/2007 | Matsueda et al. | 423/594.12 |

FOREIGN PATENT DOCUMENTS

| | | |
|---|---|---|
| EP | 1006081 | 6/2000 |
| EP | 1052008 | 11/2000 |
| EP | 1563893 | 8/2005 |
| JP | 2000-15101 | 1/2000 |
| JP | 2001-347167 | 12/2001 |
| JP | 2002-518171 | 6/2002 |
| JP | 2004-275919 | 10/2004 |

* cited by examiner

US 7,498,288 B2

EXHAUST GAS-PURIFYING CATALYST AND METHOD OF MANUFACTURING THE SAME

CROSS-REFERENCE TO RELATED APPLICATIONS

This application is based upon and claims the benefit of priority from prior Japanese Patent Applications No. 2004-038091, filed Feb. 16, 2004; and No. 2004-356982, filed Dec. 9, 2004, the entire contents of both of which are incorporated herein by reference.

BACKGROUND OF THE INVENTION

1. Field of the Invention

The present invention relates to an exhaust gas-purifying catalyst and a method of manufacturing the same, and more particularly to an exhaust gas-purifying catalyst using a stabilized zirconia as a carrier or support, and a method of manufacturing the same.

2. Description of the Related Art

In recent years, the regulation of exhaust gas of motor vehicles is being made stricter, increasing the necessity for further decreasing the amounts of hydrocarbons (HC), carbon monoxide (CO) and nitrogen oxides ($NO_X$) in the exhaust gases.

Hitherto, supported catalysts in which a noble metals (catalyst active component) such as rhodium is supported on a porous support have been widely used as catalysts for purifying exhaust gas from motor vehicles. Such supported catalysts are called three-way catalysts, because they can oxidize CO and HC and reduce $NO_X$ in the exhaust gas simultaneously.

Conventionally, γ-alumina is used as the support. However, γ-alumina undergoes phase-transition into α-alumina during use at high temperatures for a long period of time, and consequently the specific surface area of γ-alumina decreases. In addition, rhodium becomes solid-solutioned into the alumina during use at high temperatures, and the catalyst performances are lowered (see Japanese Patent Application Disclosure (KOKAI) No. 2001-347167).

Under the circumstances, support materials superior in thermal stability are required, instead of alumina. For example, Japanese Patent Application Disclosure (KOKAI) No. 2000-15101 discloses supporting rhodium on a zirconia support stabilized with an alkaline earth metal. Further, Japanese Patent Application Disclosure (KOKAI) No. 2002-518171 discloses a catalyst in which rhodium is supported on a zirconia support stabilized with a rare earth element.

Indeed, the stabilized zirconia supports are superior in thermal stability. However, it has been found by the present inventors that catalysts wherein a noble metal is supported on the stabilized zirconia support largely decrease in catalytic performances due to the fact that the surface noble metal particles aggregate or grow under the fluctuation of the atmosphere (alternate fluctuation between lean (oxidizing) atmosphere and rich (reducing) atmosphere during use at high temperatures, though they are superior in initial performances.

BRIEF SUMMARY OF THE INVENTION

Accordingly, it is an object of the present invention to provide a stabilized zirconia supported catalyst for purifying exhaust gases which is suppressed in lowering of the catalyst performance during use under atmospheres at high temperatures, and to provide a method of manufacturing the same.

According to a first aspect of the present invention, there is provided an exhaust gas-purifying catalyst comprising a support and a catalyst active component including at least one noble metal supported by at least a portion of the support, the support comprising a stabilized zirconia containing at least one stabilizing element selected from rare earth elements and alkaline earth elements, 20 to 80% by weight of the total amount of the active component being supported in the support in the form of solid solution with the stabilized zirconia, 80 to 20% by weight of the total amount of the active component being supported on the surface of at least a portion of the support.

In one embodiment of the present invention, the support may contain a second stabilized zirconia containing at least one stabilizing element selected from rare earth elements and alkaline earth elements and not containing solid-solutioned catalyst active components. The second stabilized zirconia may or may not support the catalyst active component on its surface.

Further, in one embodiment of the present invention, the support may contain, in addition to, or instead of, the second stabilized zirconia, at least one non-zirconia support selected from the group consisting of alumina, ceria, silica, titania, zeolite and a mixture thereof. The non-zirconia support may not support any catalyst active component, or may support a catalyst active component on its surface.

According to a second aspect of the present invention, there is provided a method of manufacturing an exhaust gas-purifying catalyst comprising supporting a catalyst active component including at least one noble metal on a support comprising a stabilized zirconia containing at least one stabilizing element selected from rare earth elements and alkaline earth elements, solid-solutioning 20 to 80% by weight of the total amount of the active component into the support, and supporting 80 to 20% by weight of a total amount of the active component on a surface of at least a portion of the support.

DETAILED DESCRIPTION OF THE INVENTION

Figure 1:
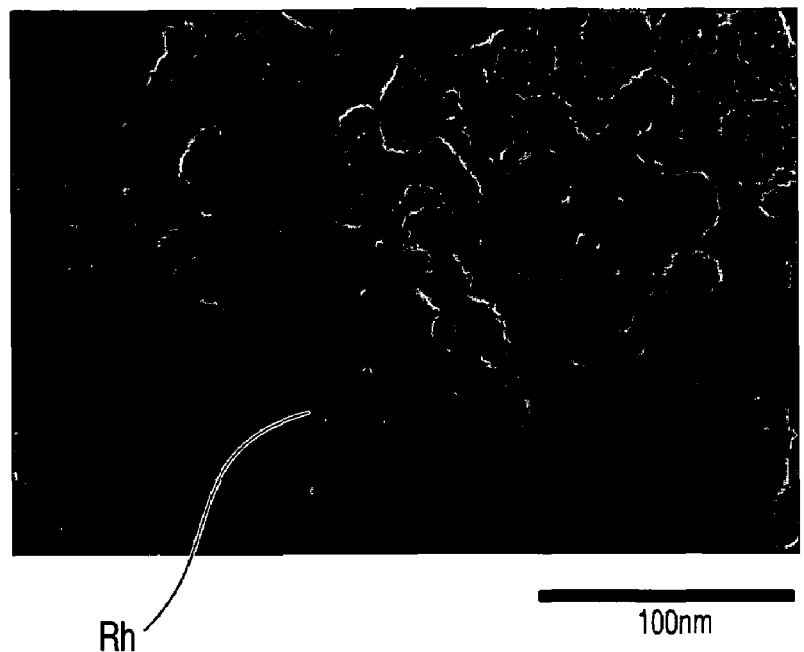
FIG. 1 shows a SEM photograph of the catalyst of Example 1, which will be described later in detail, after aging.

An exhaust gas-purifying catalyst according to an aspect of the invention comprises at least one noble metal, which is an active component of the catalyst, supported by a support comprising stabilized zirconia powder (particles), and the specified amount of the noble metal is solid-solutioned into the stabilized zirconia.

The stabilized zirconia is stabilized by containing at least one stabilizing element selected from rare earth elements and alkaline earth elements therein.

Examples of rare earth elements, as the stabilizing element, include scandium (SC), yttrium (Y) and lanthanoids. Preferred are yttrium (Y), lanthanum (La), cerium (Ce), neodymium (Nd), and praseodymium (Pr). Lanthanum is particularly preferred. Examples of alkaline earth elements, as the stabilizing element, include calcium (Ca), strontium (Sr), barium (Ba) and radium (Ra). Barium is preferred. These stabilizing elements may be used singly or in combination.

It is preferable that the stabilized zirconia contains the stabilizing element in an amount of 0.1 to 20 atoms based on 100 zirconium atoms in the zirconia. If the amount of the stabilizing element is less than 0.1 atomic percent, the stabilizing effect for the zirconia may not be sufficient. On the other hand, if the amount of the stabilizing element exceeds 20 atomic percent, foreign phases precipitate in zirconia, which may decrease the catalyst performances. The crystal structure of the zirconia stabilized with the stabilizing element is of cubic or tetragonal crystals It is preferable that the stabilized zirconia particles have a specific surface area of 30 $m^2/g$ to 100 $m^2/g$.

The stabilized zirconia can be prepared by any method known in the art. For example, zirconia powder is added to an aqueous solution containing the stabilizing element in the form of a water-soluble salt, and the mixture is sufficiently stirred. The resulting dispersion is evaporated to dryness. The dried material is heat treated preferably at 50 to 200° C. for 1 to 48 hours, and then baked at 400 to 1000° C., preferably 650 to 1000° C., for 1 to 12 hours, preferably 2 to 4 hours to prepare the stabilized zirconia. Examples of the water-soluble salt of the stabilizing element include, for example, inorganic acid salts such as sulfates, nitrates, hydrochlorates and phosphates, and organic acid salts such as acetates and oxalates. Among them, nitrates are preferred. There can be used a stabilized zirconia containing a stabilizing element at a proportion substantially the same as the proportion of the water-soluble salt of a stabilizing element to zirconia powder used as a raw material.

An exhaust gas-purifying catalyst according to the present invention includes at least one noble metal (catalyst active component) supported by the support. 20 to 80% by weight of the total amount of the noble metal supported by the support are supported in the support in the form of solid-solution with the stabilized zirconia, while remaining 80 to 20% by weight are supported on the surface of at least part of the support.

If the amount of the noble metal solid-solutioned with the zirconia is less than 20% by weight, durability of the catalyst is lowered. On the other hand, if the amount of the noble metal supported on the surface of the support is less than 20% by weight, initial catalyst activity can not be brought about sufficiently. The amount of noble metal solid-solutioned with the stabilized zirconia is preferably 30 to 70% by weight of the total supported amount of noble metal (hence the amount of noble metal supported on the surface of the support is preferably 70 to 30% by weight of the total supported amount of noble metal). The total supported amount of the active component noble metal (solid-solutioned+surface supported noble metals) is usually 0.01 to 5%, preferably 0.1 to 1% by weight of the total weight of the catalyst (support+noble metal).

Examples of the noble metal, the catalyst active component, include rhodium, palladium, an alloy of rhodium with platinum, and an alloy of palladium with platinum. Among them, rhodium is preferred.

In a first embodiment of the present invention, the support may be constituted solely by the stabilized zirconia particles with which the noble metal forms a solid-solution. In this case, the surface supported noble metal is present on the surfaces of the noble metal solid-solutioned, stabilized zirconia particles.

In a second embodiment, the support may contain a second zirconia particles, in addition to the noble metal solid-solutioned, stabilized zirconia particles. The second stabilized zirconia is the same as the noble metal solid-solutioned, stabilized zirconia except that the second stabilized zirconia does not have any solid-solutioned noble metal. In the second embodiment, the noble metal solid-solutioned, stabilized zirconia particles may or may not support a noble metal on their surfaces.

In a third embodiment, the support may contain non-zirconia (support) particles, in addition to the noble metal solid-solutioned, stabilized zirconia particles. The non-zirconia support does not have any solid-solutioned noble metal. The non-zirconia support particles may or may not support noble metal on their surfaces. The non-zirconia support can be selected from alumina, ceria, silica, titania, zeolite and a mixture thereof.

Thus, in the exhaust gas-purifying catalyst of the present invention, the support always contains the noble metal solid-solutioned, stabilized zirconia particles, but the support, on the surface of which the noble metal is supported, may be constituted by the noble metal solid-solutioned, stabilized zirconia particles alone, by the noble metal solid-solutioned, stabilized zirconia in combination with the second stabilized zirconia and/or the non-zirconia particles, or by the second stabilized zirconia and/or the non-zirconia particles (in this case, on the surface of the noble metal solid-solutioned, stabilized zirconia, the noble metal may or may not be supported). Further, in the present invention, the support may contain the second stabilized zirconia and/or non-zirconia particles supporting no noble metals. In any case, the active component is supported by the support such that 20 to 80% by weight of the total amount of the active component are supported in the support in the form of solid-solution with the stabilized zirconia, and remaining 80 to 20% by weight are supported on the support surface.

A method of manufacturing an exhaust gas-purifying catalyst according to the present invention comprises two steps, i.e., solid solution treatment and surface supporting.

In the solid solution treatment, 20 to 80% by weight of the total supported noble metal are solid-solultioned in the stabilized zirconia. More specifically, powder of the stabilized zirconia can be sufficiently dispersed in water, using, e.g., ultrasonic wave, and the resultant dispersion is added to an aqueous solution containing a required amount of the noble metal in the form of a water-soluble salt to adsorb and support the noble metal salt on the surface of the support, which is then filtered and dried. All of the noble metal used can be supported on the support. The resultant dried powder can be baked in air under the temperature and time conditions sufficient to cause the noble metal to be solid-solutioned in the stabilized zirconia powder. The baking temperature for forming the solid solution is preferably 600 to 1000° C., more preferably 700 to 900° C. The baking time varies dependent on the baking temperature, but is usually 2 to 4 hours. Examples of the water-soluble noble metal salt include inorganic acid salts such as sulfates, nitrates, hydrochloric acid salts and phosphates. Among them, nitrates are preferred. In this solid solution treatment, about 60 to 100% by weight of the noble metal initially supported on the surface of the stabilized zirconia is solid-solutioned.

In the surface supporting step, 80 to 20% by weight of the total amount of the supported noble metal are supported on the surface of the support. More specifically, as described with reference to the solid-solution treatment, the noble metal salt is adsorbed and supported on the surface of the support powder (the noble metal solid-solutioned stabilized zirconia powder alone, or a mixture of the noble metal solid-solutioned stabilized zirconia powder with the second stabilized zirconia and/or the non-zirconia powder, or the second stabilized zirconia and/or the non-zirconia powder), and the mixture is filtered and dried. All of the noble metal used is supported on the support surface. The resultant powder can be baked in air under the temperature and time conditions under which the surface noble metal is substantially not solid-solutioned but is sufficiently adhered to the support surface. The baking temperature is preferably 100 to 400° C., more preferably 200 to 300° C. The baking time varies dependent on the baking temperature, but is usually 1 to 3 hours. In this surface supporting step, all of the surface noble metal salt used as the raw material can be supported on the support surface in the form of oxides. It should be noted that an exhaust gas-purifying catalyst according to the invention can also be prepared by simply mixing the noble metal solid-solutioned stabilized zirconia powder having the noble metal also on its surface with the second zirconia and/or non-zirconia powder not supporting any noble metal. Further, an exhaust gas-purifying catalyst according to the invention can also be prepared by simply mixing the noble metal solid-solutioned stabilized zirconia powder having no noble metal on its surface with the second zirconia and/or non-zirconia powder supporting the noble metal on its surface.

The catalyst thus obtained can be used after being made into pellets. Alternatively, the catalyst can be coated on a honeycomb support (e.g., a cordierite honeycomb support) by a wash coat method.

The amount of the noble metal solid-solutioned in the stabilized zirconia can be analyzed by means of ICP emission spectrometry. More specifically, the catalyst can be immersed in a dissolving agent which does not dissolve the noble metal oxide particles present on the support surface, but dissolves the stabilized zirconia (including the solid-solutioned noble metal) which constitutes the support, and the mixture is sufficiently stirred to dissolve the stabilized zirconia. The resultant solution is analyzed for the noble metal by means of ICP emission spectrometry. As the dissolving agent, a solution of hydrofluoric acid and water in a volume ratio of 1/15 can be used, and the dissovging operation can be carried out at room temperature (20 to 30° C.) for 12 hours.

The catalyst of the present invention repeatedly undergoes a cycle that the noble metal solid-solutioned in the stabilized zirconia deposits on the support surface as fine particles (particle diameter of several angstroms to 10 angstroms) under high temperature rich (reducing) atmosphere in which air/fuel ratio is small, i.e., the fuel concentration is high, and the deposited noble metal is solid-solutioned again in the stabilized zirconia under high temperature lean (oxidizing) atmosphere in which air/fuel ratio is large, i.e. the fuel concentration is low. Thus, the catalyst of the invention is suppressed in the growth of the noble metal particles, maintains its high catalyst performances and is not largely lowered in the catalyst performances even if used under the fluctuation of atmosphere at high temperatures. On the other hand, the noble metal supported in advance on the support surface exhibits its catalyst activity from the early stage of use during which the noble metal solid-solutioned in advance in the stabilized zirconia may not function as a catalyst. In this way, the catalyst of the present invention can sufficiently exhibits the catalytic activity from the beginning and over a long period of time. Further, the noble metal supported in advance on the support surface is part of the total noble metal and is highly dispersed on the support surface. Thus, the surface noble metal, even small in amount, can exhibit the initial catalytic activity sufficiently, and can be suppressed in sintering since dispersibility on the support surface is high.

The present invention will be described below by way of its Examples, but the present invention should not be limited thereto.

EXAMPLE 1

In this Example, a catalyst having rhodium in an amount of 0.5% by weight in total supported by a stabilized zirconia was prepared.

(A) 50 g of a commercially available zirconia powder having a specific surface area of 90 m$^2$/g was added to 100 mL of an aqueous solution containing lanthanum nitrate in an amount to provide La/Zr atomic ratio of 8/100, and the mixture was evaporated to dryness at 90° C. while stirring. The resultant mixture was further dried at 120° C. for 12 hours and baked at 800° C. for 2 hours, affording lanthanum-stabilized zirconia support (powder). X-ray diffraction analysis showed that the crystallographic structure of the obtained stabilized zirconia was cubic. The specific surface area of the stabilized zirconia support was found to be 70 m$^2$/g.

(B) 50g of the stabilized zirconia powder was ultrasonically stirred in 50 mL of ion-exchanged water and dispersed. To the resultant dispersion, an aqueous solution containing rhodium in an amount corresponding to ½ of the total amount of rhodium to be supported was added at once to adsorb and support the rhodium nitrate on the surface of the stabilized zirconia support powder, and the mixture was filtered by suction. The filtrate was analyzed for rhodium by ICP emission spectrometry, and no rhodium was detected. Thus, the supporting rate of rhodium was 100%.

This rhodium-supporting stabilized zirconia powder was dried at 110° C. for 12 hours, and then baked in air at 800° C. for 3 hours to solid-solution the rhodium into the stabilized zirconia. A portion of the stabilized zirconia in which rhodium was solid-solutioned was immersed in a solution of hydrofluoric acid and water in a volume ratio of 1/15 at room temperature for 12 hours to dissolve the zirconia. ICP emission spectrometry of the resultant solution showed that 89% by weight of zirconia supported on the stabilized zirconia support surface were solid solutioned in the stabilized zirconia.

(C) 50g of the rhodium solid-solutioned stabilized zirconia powder obtained above was ultrasonically stirred and dispersed in 50 mL of ion-exchanged water for 10 minutes. To the resultant dispersion, an aqueous solution containing rhodium in an amount corresponding to ½ of the total amount of rhodium to be supported was added at once to adsorb and support the rhodium nitrate on the surface of the stabilized zirconia support powder, and the mixture was filtered by suction. The rhodium-supporting stabilized zirconia powder thus obtained was dried at 110° C. for 12 hours and then baked in air at 250° C. for 2 hours to support the rhodium on the support surface.

(D) The catalyst powder thus obtained was pressed, pulverized and granulated into pellets having a diameter of 0.5 to 1.0 mm.

EXAMPLE 2

The same procedures were followed as in Example 1, except that an aqueous solution containing rhodium nitrate in an amount corresponding to ¼ of the total amount of rhodium to be supported was used in Example 1(B), and that an aqueous solution containing rhodium nitrate in an amount corresponding to ¾ the total amount of rhodium to be supported was used in Example 1(C), thus preparing a desired catalyst. In the catalyst obtained, 25% by weight of the total amount of rhodium were solid-solutioned in the stabilized zirconia and remaining 75% by weight were supported on the stabilized zirconia support surface.

EXAMPLE 3

The same procedures were followed as in Example 1, except that an aqueous solution containing rhodium nitrate in an amount corresponding to ⅔ of the total amount of rhodium to be supported was used in Example 1(B) and an aqueous solution containing rhodium nitrate in an amount corresponding to ⅓ of the total amount of rhodium to be supported was used in Example 1(C), preparing a desired catalyst. In the catalyst obtained, 64% by weight of the total amount of rhodium was solid-solutioned in the stabilized zirconia and remaining 36% by weight were supported on the stabilized zirconia support surface.

EXAMPLE 4

In this Example, a catalyst having noble metals in an amount of 0.5% by weight in total (rhodium: 0.4%; platinum 0.1%) supported by a stabilized zirconia was prepared. The same procedures were followed as in Example 1(A) and (B). The rhodium solid-solutioned stabilized zirconia powder thus obtained was added to an aqueous solution containing rhodium nitrate in an amount corresponding to ½ of the total amount of rhodium to be supported and also dinitrodiamine platinate salt to adsorb and support the rhodium nitrate and dinitrodiamine platinate salt on the zirconia surface. The resultant powder was dried at 110° C. for 12 hours, and baked in air at 250° C. for an hour, which was then treated as in Example 1(D) to prepare a pellet catalyst.

EXAMPLE 5

The same procedures were followed as in Example 1, except that palladium nitrate was used instead of rhodium nitrate, thus preparing a pellet catalyst.

COMPARATIVE EXAMPLE 1

50 g of the lanthanum-stabilized zirconia powder obtained in Example 1(A) was ultrasonically stirred in 50 mL of ion-exchanged water for 10 minutes to disperse the powder. To the resultant dispersion, an aqueous solution of rhodium nitrate in an amount corresponding to the total amount of rhodium to be supported was added at once to adsorb and support the rhodium nitrate on the stabilized zirconia surface, and the mixture was filtered by suction. The resultant rhodium-supporting stabilized zirconia powder was dried at 110° C. for 12 hours, and then baked in air at 250° C. for 2 hours to support the rhodium on the support surface, and the resultant powder was made into pellets.

COMPARATIVE EXAMPLE 2

The same procedures were followed as in Example 5, except that the solid-solution treatment was not carried out, thus preparing a pellet catalyst.

The initial catalytic activity and the activity after aging of each of the catalysts obtained in Examples 1-5 and Comparative Examples 1-2 were evaluated as follows.

<Evaluation of the Catalytic Activity>

A catalyst sample is set in a normal pressure fixed bed flow-through reaction apparatus. The catalyst sample is heated from 100° C. to 500° C. at a heating rate of 12° C./minute while passing a model gas corresponding to stoichiometry through the fixed bed, during which the purifying rate of $NO_X$ is continuously measured. The temperature at which 50% of $NO_X$ is removed (50% purification temperature of $NO_X$) is recorded as an index for the purification rate.

(I) Initial Catalytic Activity

A portion of each of the catalysts as obtained in Examples 1-5 and Comparative Examples 1-2 was used as a sample for the catalytic activity evaluation and was subjected to the above test for the catalytic activity evaluation.

(II) Catalytic Activity After Aging

Figure 2:
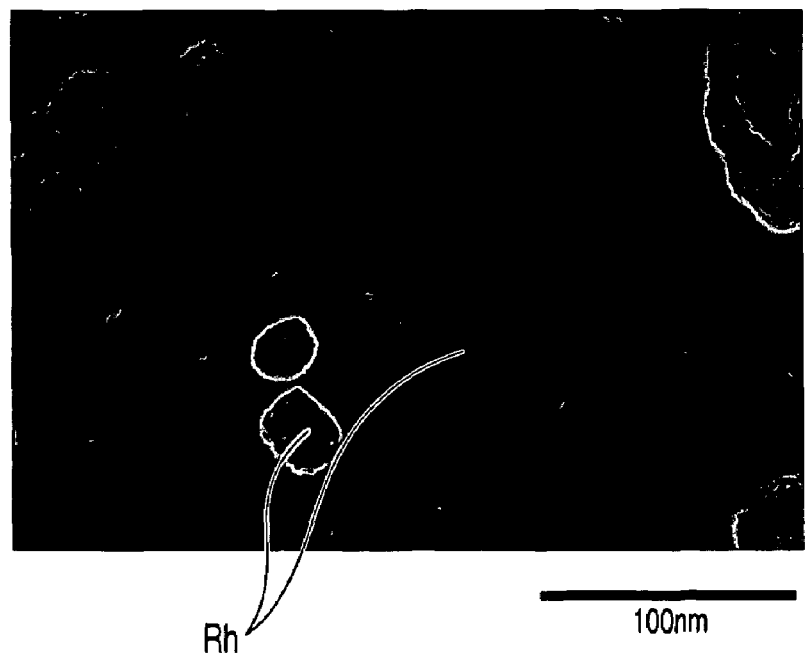
FIG. 2 shows a SEM photograph of the catalyst of Comparative Example 1, which will be described later in detail, after aging.

A portion of each of catalysts obtained in Examples 1-5 and Comparative Examples 1-2 were placed as a catalyst bed in a flow-through type aging apparatus. Then, a model lean gas consisting of nitrogen gas containing 5% by volume of oxygen and a model rich gas consisting of nitrogen gas containing 10% by volume of carbon monoxide were alternately flowed through the catalyst bed each for 5 minutes at a flow rate of 1000 mL/min. for a total of 30 hours continuously. Thereafter the catalyst was removed and subjected to the above test for evaluating a catalytic activity described above. FIGS. 1 and 2 respectively show SEM photographs of the catalysts of Example 1 and Comparative Example 1 after aging noted above. As can be seen from these FIGURES, the rhodium particles deposited from within the support onto the surface of the support is about 1 nm in the catalyst of Example 1, while the rhodium particles have grown to a particle size of several tens of microns in the catalyst of Comparative Example 1.

Results of the tests are shown in Table 1. Table 1 also shows the amount of the supported noble metal and the rate of the solid-solutioned noble metal.

TABLE 1

| Examples | Total noble metal supported (% by weight) | | | Rate of solid-solutioned noble metal (% by weight) | | | 50% purifying temp. of NOx | |
|---|---|---|---|---|---|---|---|---|
|  | Rh | Pt | Pd | Rh | Pt | Pd | Initial | After aging |
| Ex. 1 | 0.5 | 0 | 0 | 44.5 | 0 | 0 | 272 | 277 |
| Ex. 2 | 0.5 | 0 | 0 | 25.0 | 0 | 0 | 269 | 286 |
| Ex. 3 | 0.5 | 0 | 0 | 64.0 | 0 | 0 | 277 | 275 |
| Ex. 4 | 0.4 | 0.1 | 0 | 45.0 | 0 | 0 | 270 | 280 |
| Ex. 5 | 0 | 0 | 0.5 | 0 | 0 | 35.0 | 295 | 330 |
| Comp. Ex. 1 | 0.5 | 0 | 0 | 0 | 0 | 0 | 268 | 298 |
| Comp. Ex. 2 | 0 | 0 | 0.5 | 0 | 0 | 0 | 290 | 350 |

As can be seen from Table 1, the exhaust gas-purifying catalysts of the present invention scarcely increase in the 50% purification temperature of $NO_X$ after aging as compared to the initial value, while the exhaust gas-purifying catalysts of Comparative Examples 1-2 largely increase in the 50% purification temperature of $NO_X$ after aging as compared to the initial value. These results indicate that the exhaust gas-purifying catalysts of the present invention are not largely lowered in the catalytic performances even after a long period of use at a high temperature, while exhibiting sufficient catalytic activity at initial stages of use.

EXAMPLE 6

In this Example, a catalyst having rhodium in an amount of 0.5% by weight in total supported by a stabilized zirconia was prepared as follows.

The same procedures as in Example 1(A) and (B) were followed to prepare rhodium solid-solutioned stabilized zirconia powder.

On the other hand, 50 g of lanthanum-stabilized zirconia powder obtained by the same procedures as in Example 1(A) was ultrasonically stirred and dispersed in 50 mL of ion-exchanged water. To the resultant dispersion, an aqueous solution containing rhodium in an amount corresponding to ½ of the total amount of rhodium to be supported was added at once to adsorb and support the rhodium nitrate on the surface of the stabilized zirconia support powder, and the mixture was filtered by suction. The resultant stabilized zirconia powder supporting rhodium on the surface was dried at 110° C. for 12 hours, and then baked in air at 250° C. for 1 hours to obtain support powder supporting rhodium on the surface.

Then, the 50 g of the above rhodium solid-solutioned zirconia support powder and 50 g of the above support powder supporting rhodium on the surface were physically mixed to prepare a mixed catalyst powder. The catalyst powder thus obtained was pressed, pulverized and granulated into pellets having a diameter of 0.5 to 1.0 mm.

EXAMPLE 7

In this Example, a catalyst having rhodium in an amount of 0.5% by weight in total supported by a stabilized zirconia was prepared as follows.

The same procedures as in Example 1(A)-(C) were followed to prepare stabilized zirconia support powder in which rhodium was solid-solutioned and on the surface of which rhodium was supported. 50 g of this support powder was physically mixed with 50 g of stabilized zirconia support powder (with no rhodium supported) prepared as in Example 1(A). The mixed catalyst powder thus obtained was pressed, pulverized and granulated into pellets having a diameter of 0.5 to 1.0 mm.

The pellet catalysts obtained in Examples 6 and 7 were evaluated for their catalytic activity by the procedures described above. Results are shown in Table 2 below.

TABLE 2

| Examples | Total noble metal supported (% by weight) | | | Rate of solid-solutioned noble metal (% by weight) | | | 50% purifying temp. of NOx | |
|---|---|---|---|---|---|---|---|---|
| | Rh | Pt | Pd | Rh | Pt | Pd | Initial | After aging |
| Ex. 6 | 0.5 | 0 | 0 | 44.5 | 0 | 0 | 270 | 278 |
| Ex. 7 | 0.5 | 0 | 0 | 45.0 | 0 | 0 | 275 | 285 |

As can be seen from the results shown in Table 2, the exhaust gas-purifying catalysts of the present invention scarcely increase in the 50% purification temperature of $NO_X$ after aging as compared to the initial value. That is, the exhaust gas-purifying catalysts of the present invention are not largely lowered in the catalytic performances even after a long period of use at a high temperature, while exhibiting sufficient catalytic activity at initial stages of use.

EXAMPLE 8

In this Example, a catalyst having rhodium in an amount of 0.5% by weight in total supported by a stabilized zirconia was prepared as follows.

The same procedures as in Example 1(A)-(C) were followed to prepare stabilized zirconia support powder in which rhodium was solid-solutioned and on the surface of which rhodium was supported. 50 g of this support powder was physically mixed with 50 g of alumina powder and 50 g of ceria powder, to which ion-exchanged water and a binder (alumina sol) were added to prepare a slurry. This slurry was coated (coated catalyst amount: 7 g) by the wash coat method on a cordierite monolithic honeycomb support (diameter 30 mm; length 50 mm) and dried to prepare a desired monolithic catalyst.

EXAMPLE 9

In this Example, a catalyst having rhodium in an amount of 0.5% by weight in total supported by a stabilized zirconia was prepared as follows.

The same procedures as in Example 1(A)-(B) were followed to prepare stabilized zirconia support powder in which rhodium was solid-solutioned. 50 g of this support powder was physically mixed with 50 g of alumina powder and 50 g of ceria powder, to which ion-exchanged water and a binder (alumina sol) were added to prepare a slurry. To this slurry, an aqueous solution of rhodium nitrate containing rhodium in an amount corresponding to ½ of the total rhodium amount to be supported to adsorb and support the rhodium on the support powder surface. The resultant slurry was coated (coated catalyst amount: 7 g) by the wash coat method on a cordierite monolithic honeycomb support (diameter 30 mm; length 50 mm) and dried to prepare a desired monolithic catalyst.

EXAMPLE 10

In this Example, a catalyst having rhodium in an amount of 0.5% by weight in total supported by a stabilized zirconia was prepared as follows.

The same procedures as in Example 1(A)-(B) were followed to prepare stabilized zirconia support powder in which rhodium was solid-solutioned. 50 g of this support powder was physically mixed with 50 g of alumina powder and 50 g of ceria powder, to which ion-exchanged water and a binder (alumina sol) were added to prepare a slurry. This slurry was coated (coated catalyst amount: 7 g) by the wash coat method on a cordierite monolithic honeycomb support (diameter 30 mm; length 50 mm). On the resultant wash coat layer, an aqueous solution of rhodium nitrate containing rhodium in an amount corresponding to ½ of the total rhodium amount to be supported was coated, dried at 110° C. for 2 hours, and then baked in air at 250° C. for 1 hour to prepare a desired monolithic catalyst.

The catalysts obtained in Examples 8-10 were evaluated for their catalytic activity by the procedures described above. Results are shown in Table 3 below.

TABLE 3

| Examples | Total noble metal supported (% by weight) | | | Rate of solid-solutioned noble metal (% by weight) | | | 50% purifying temp. of NOx | |
|---|---|---|---|---|---|---|---|---|
| | Rh | Pt | Pd | Rh | Pt | Pd | Initial | After aging |
| Ex. 8 | 0.5 | 0 | 0 | 44.5 | 0 | 0 | 256 | 263 |
| Ex. 9 | 0.5 | 0 | 0 | 45.0 | 0 | 0 | 257 | 265 |
| Ex. 10 | 0.5 | 0 | 0 | 45.0 | 0 | 0 | 254 | 266 |

As can be seen from the results shown in Table 3, the exhaust gas-purifying catalysts of the present invention scarcely increase in the 50% purification temperature of $NO_X$ after aging as compared to the initial value. That is, the exhaust gas-purifying catalysts of the present invention are not largely lowered in the catalytic performances even after a long period of use at a high temperature, while exhibiting sufficient catalytic activity at initial stages of use.

What is claimed is:

1. An exhaust gas-purifying catalyst comprising a support and a catalyst active component including at least one noble metal supported by at least a portion of the support, the support comprising particles of a stabilized zirconia containing at least one stabilizing element selected from rare earth elements and alkaline earth elements, 20 to 80% by weight of a total amount of the active component being supported in the support in a form of solid solution with the stabilized zirconia, 80 to 20% by weight of a total amount of the active component being supported on a surface of at least a portion of the support, wherein the support further comprises particles of a second stabilized zirconia containing at least one stabilizing element selected from rare earth elements and alkaline earth elements and not having the active component solid-solutioned therein.

2. The catalyst according to claim 1, wherein the noble metal is selected from rhodium, palladium, an alloy of rhodium with platinum or an alloy of palladium with platinum.

3. The catalyst according to claim 1, wherein the stabilized zirconia contains the stabilizing element in an amount of 0.1 to 20 atomic % with respect to zirconium contained in the stabilized zircoma.

4. The catalyst according to claim 1, wherein the second zirconia does not support the active component.

5. The catalyst according to claim 1, wherein the second zirconia supports the active component on its surface.

6. An exhaust gas-purifying catalyst comprising a support and a catalyst active component including at least one noble metal supported by at least a portion of the support, the support comprising particles of a stabilized zirconia containing at least one stabilizing element selected from rare earth elements and alkaline earth elements, 20 to 80% by weight of a total amount of the active component being supported in the support in a form of solid solution with the stabilized zirconia, 80 to 20% by weight of a total amount of the active component being supported on a surface of at least a portion of the support, wherein the support further comprises particles of at least one non-zirconia selected from the group consisting of alumina, ceria, silica, titania, zeolite and a mixture thereof.

7. The catalyst according to claim 6, wherein the non-zirconia support does not support the active component.

8. The catalyst according to claim 6, wherein the non-zirconia support supports the active component on its surface.

9. The catalyst according to claim 6, wherein the noble metal is selected from rhodium, palladium, an alloy of rhodium with platinum or an alloy of palladium with platinum.

10. The catalyst according to claim 6, wherein the stabilized zirconia contains the stabilizing element in an amount of 0.1 to 20 atomic % with respect to zirconium contained in the stabilized zirconia.

11. A method of manufacturing an exhaust gas-purifying catalyst comprising supporting a catalyst active component including at least one noble metal on a support comprising a stabilized zirconia containing at least one stabilizing element selected from rare earth elements and alkaline earth elements, solid-solutioning 20 to 80% by weight of a total amount of the active component into the support, and supporting 80 to 20% by weight of a total amount of the active component on a surface of at least a portion of the support.

12. The method according to claim 11, wherein the solid-solutioning is carried out at a temperature of 600 to 1000.degree. C.

* * * * *